United States Patent Office 3,431,387
Patented Mar. 4, 1969

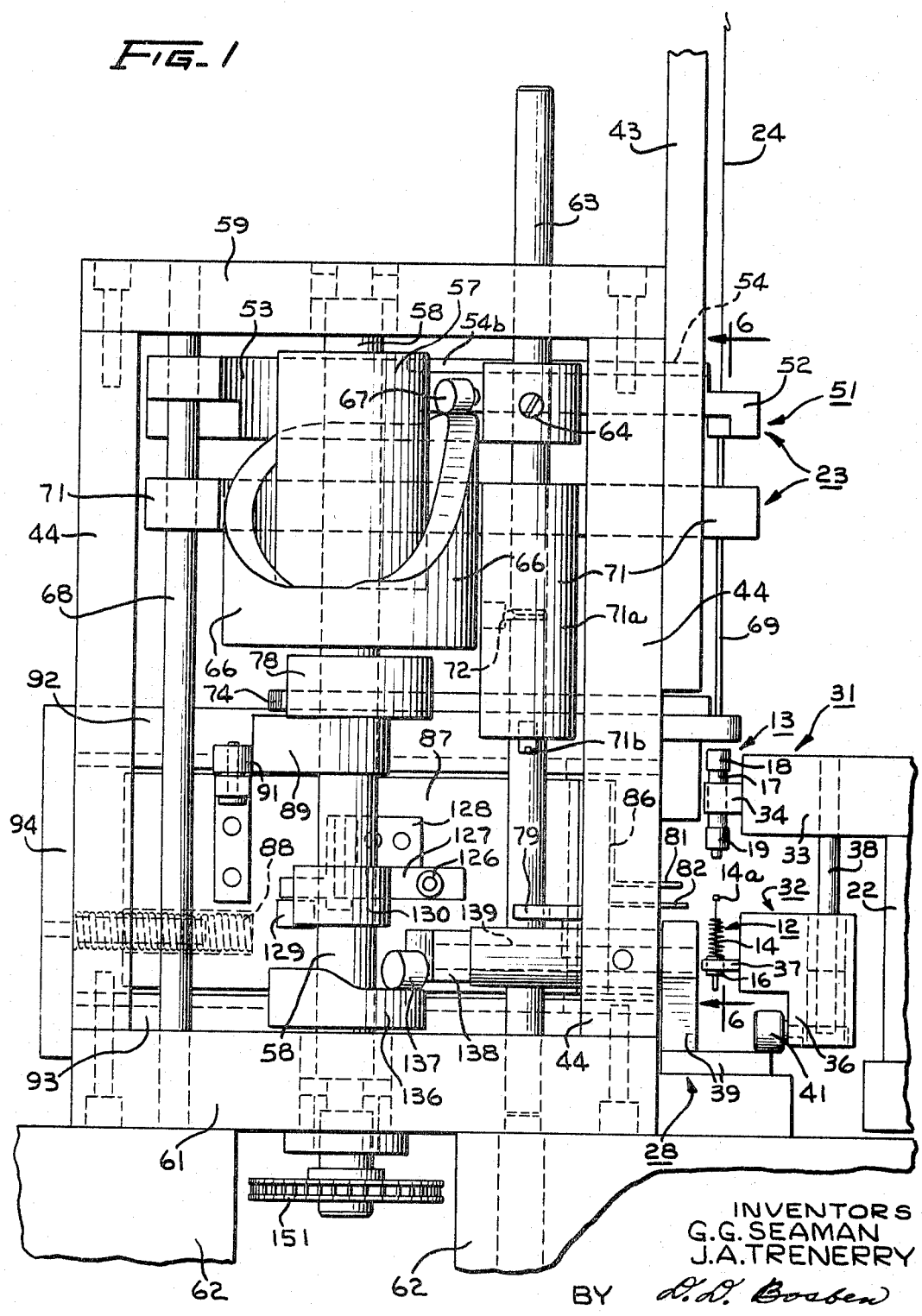

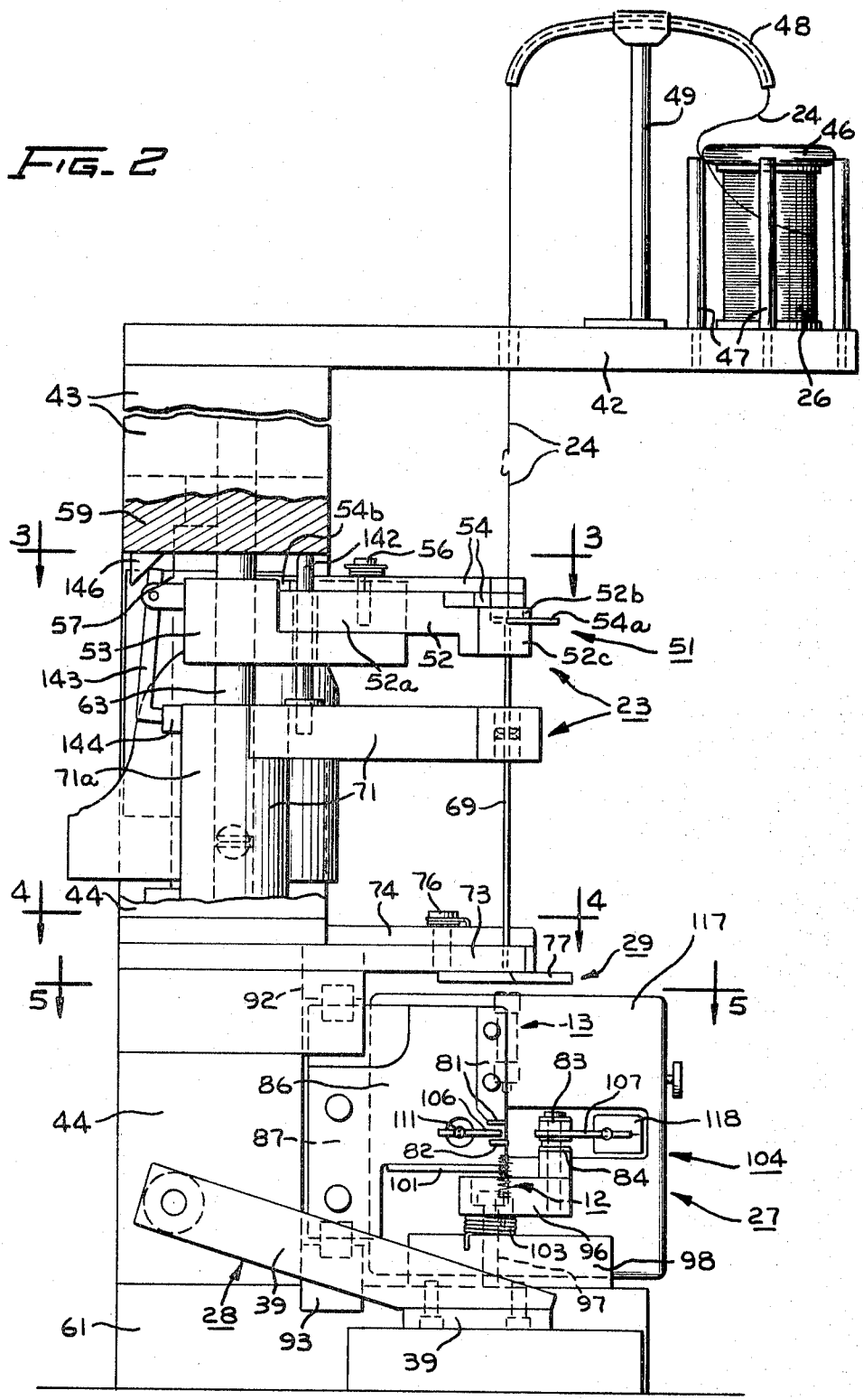

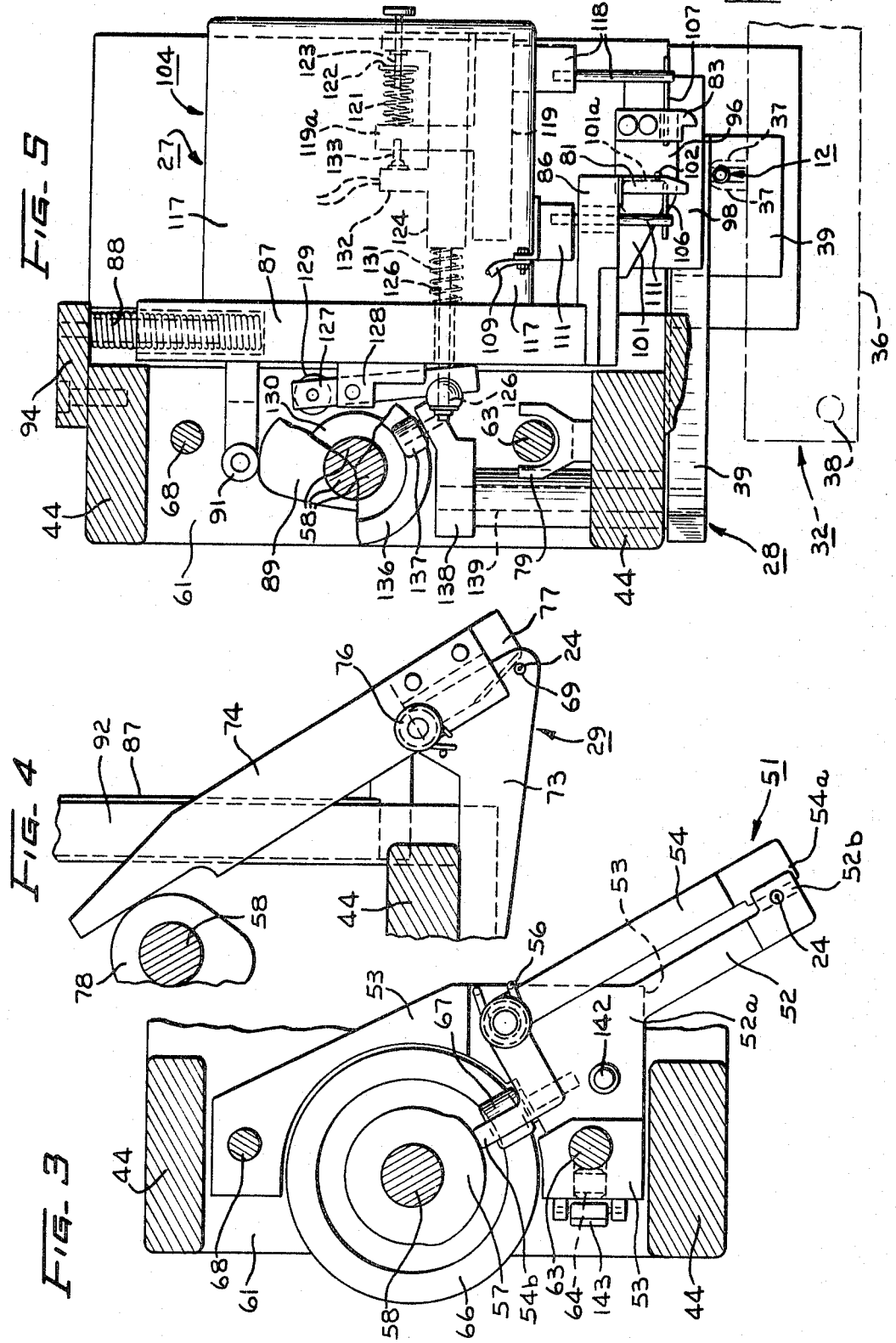

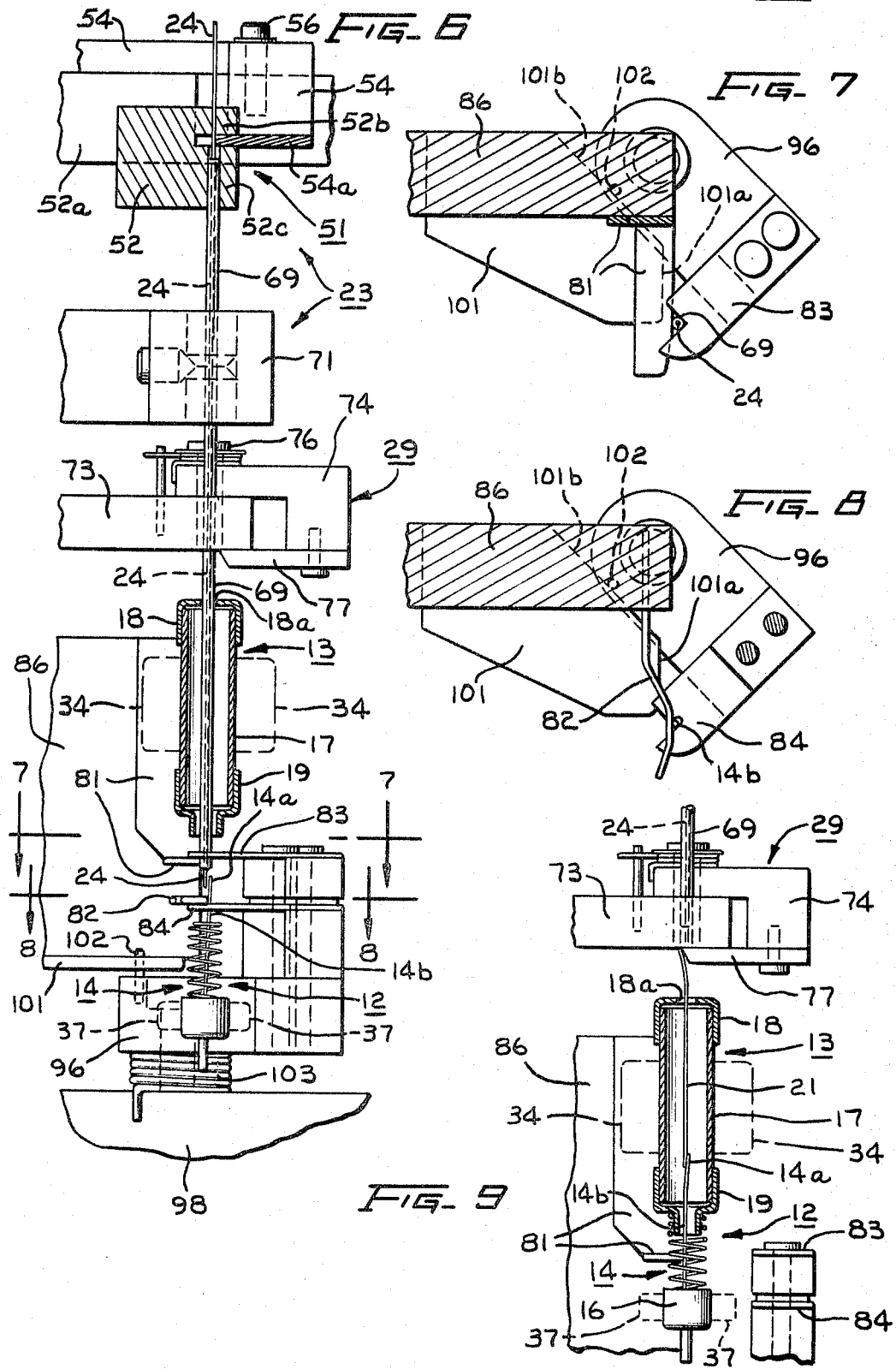

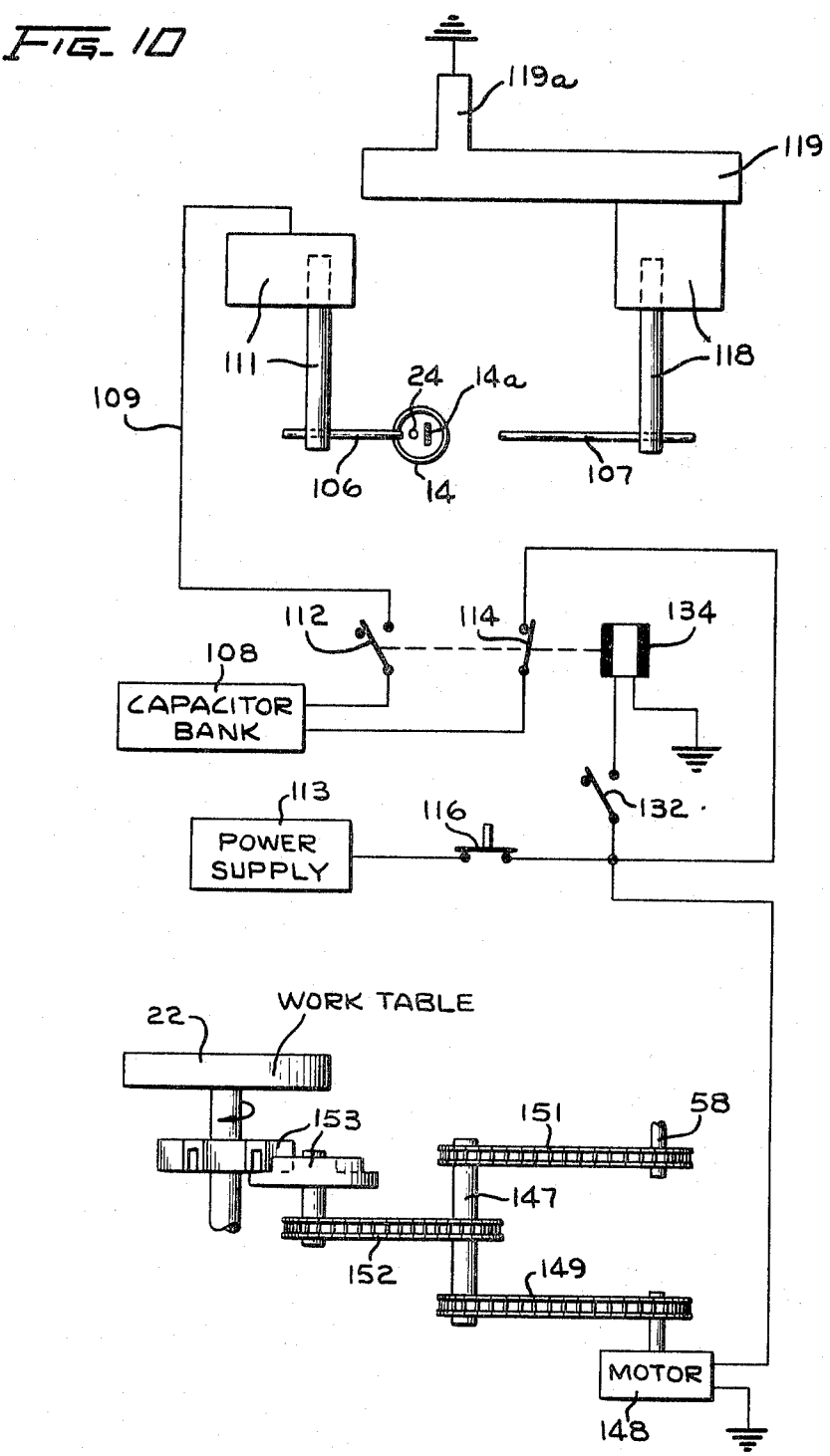

3,431,387
ARTICLE ASSEMBLING APPARATUS
Gary G. Seaman, Omaha, and James A. Trenerry, Millard, Nebr., assignors to Western Electric Company, Incorporated, New York, N.Y., a corporation of New York
Filed May 28, 1965, Ser. No. 459,791
U.S. Cl. 219—79                                 8 Claims
Int. Cl. B23k 9/12

ABSTRACT OF THE DISCLOSURE

In apparatus for welding wire to an article, such as another wire, the first-mentioned wire has an end thereof withdrawn within a tubular guide member as the wire is fed by the guide member to a position adjacent the article, and while a wire exit end of the guide member and a preselected portion of the article are substantially aligned with one another. Subsequently, the end of the wire is fed out of the guide member and the wire is welded to the article. The guide member then is retracted relative to the article and the wire, and if the wire extends from a continuous supply the wire is cut between the guide member and the article to form a length of wire secured to the article and to form a new end on the wire. This new end of the wire subsequently is withdrawn within the guide member for the next cycle of operation. In the disclosed embodiment of the invention the article is assembled to a tubular second article and the wire is fed in and with the guide member through the tubular article for the welding of the wire to the first article.

---

This invention relates to article assembling apparatus, and more particularly to article assembling apparatus in which a portion of a wire is to be secured to a preselected portion of another article. It is an object of this invention to provide new and improved apparatus of this character.

Certain electrical fuse assemblies used extensively in telephone switching equipment each include a coil spring having an elongated wire-like portion which extends axially through the coils of the spring beyond one of its ends. Each fuse also includes a tubular body sub-assembly, the end coil at the one end of the coil spring being secured to and seated on one end of the body sub-assembly with the axially extending portion of the spring, and a fuse element in the form of a length of relatively thin resistance wire having one end secured to the axially extending portion, extending axially through the body sub-assembly. The other end of the fuse wire extends out of and is secured to the opposite end of the body sub-assembly such that the coil spring is held in a normally compressed state against the one end of the sub-assembly, placing the fuse wire under constant tension.

Heretofore, the provision of the fuse wire secured at one end to the axially extending portion of the coil spring and secured at its other end to the body sub-assembly such that the coil spring is in a compressed state, has been accomplished manually, by soldering. In this regard, resistance wire is fed from a continuous supply through the body sub-assembly, and a loose half-hitch is tied in the wire adjacent its free end. The loose half-hitch is looped over a spade portion on the axially extending portion of the coil spring, whereupon the wire is pulled taut to tighten the half-hitch about the spade portion. This connection of the wire to the spade portion then is dipped in a zinc chloride flux so that solder will wet to the resistance wire, and is positioned adjacent a puddle of solder on the tip of a soldering iron. When the connection is removed from the solder puddle the solder solidifies to secure the wire to the spade portion. Excess flux adjacent the soldered connection is removed by washing with alcohol. Subsequently, the coil spring is seated against and soldered to the adjacent end of the body sub-assembly, and the wire is broken off adjacent the other end of the body sub-assembly and soldered thereto to hold the spring in its compressed state.

In the foregoing procedure, the wire must be tied to the spade portion of the coil spring to provide a mechanical connection between the relatively thin wire (five thousandths of an inch) and the spring because solder alone, being a poor bonding agent, does not provide a sufficiently strong connection. The removal of excess zinc chloride flux after the soldering operation must be done with an alcohol which is of a relatively expensive type, and is necessary because the flux is highly corrosive in nature. Further, the highly corrosive flux creates a health hazard in that it causes dermatitis, resulting in lost man hours, and also tends to destroy soldering tips at a rapid rate. The flux and the flux removal operation also create a housekeeping problem. The net result is a process which is relatively slow and time consuming, unsafe and relatively expensive.

Accordingly, another object of this invention is to provide new and improved apparatus for securing a wire to a wire on a coil spring, wherein at least one of the wires is of relatively small diameter and wherein the wires are to extend axially through a second tubular article and are to hold the coil spring in compressed engagement with the tubular article.

A further object of this invention is to provide new and improved apparatus for securing a wire to a preselected portion of an article.

A still further object of this invention is to provide new and improved apparatus for securing a first wire to a second wire.

Another object of this invention is to provide new and improved apparatus for securing a wire to a first article wherein the wire is to extend axially through a tubular second article.

Apparatus for carrying out the invention may include a guide tube through which wire is fed from a continuous supply, and support means for supporting a tubular first article and a second article in spaced relationship. With the free end of the wire initially withdrawn within a wire exit end of the guide tube, relative movement is caused between the guide tube and the support means so that the guide tube is received axially through the tubular first article to position the wire exit end of the guide tube adjacent the second article. An aligning mechanism then locates the wire exit end of the guide tube substantially in alignment with a preselected portion of the second article, whereupon relative movement is caused between the wire and the guide tube to feed the free end of the wire out of the guide tube adjacent the preselected portion of the second article. A free end portion of the wire then is welded to the preselected portion of the second article by a welding mechanism.

After the welding operation is completed, relative movement is caused between the guide tube and the tubular first article to cause withdrawal of the guide tube from the article. A wire cutting mechanism then cuts the wire between the wire exit end of the guide tube and the tubular first article, to form a length of wire welded to the preselected portion of the second article and to form a new free end on the wire. Subsequently, relative movement is caused between the wire and the guide tube to withdraw the newly formed free end of the wire within the guide tube adjacent its wire exit end.

More specifically, in a preferred embodiment of the invention, the first and second articles are moved into and out of welding position by an indexing mechanism, and are supported in respective relatively movable first and second support means on the indexing mechanism. Further, the preselected portion of the second article is a second wire.

After the guide tube has been axially received through the tubular first article so that its wire exit end is adjacent this second wire, a reciprocating member is moved to an advanced position so that locating members thereon engage the guide tube and the second wire, respectively. At substantially the same time, pivoted locating members having notches therein are pivoted in response to the movement of the reciprocating member to its advanced position to engage the guide tube and the second wire, respectively, so that the elongated locating members and the pivoted locating members trap the guide tube and the second wire in apices of the notches in respective ones of the pivoted locating members, to locate the wire exit end of the guide tube and the second wire substantially in alignment with one another. The free end of the wire in the guide tube then is fed from the wire exit end thereof into a position adjacent the second wire, as the result of relative movement between the guide tube and a releasable wire gripping mechanism. Opposed electrodes, which are mounted on the reciprocating member for movement therewith, then are moved toward one another to engage the two wires therebetween to weld them to one another.

After the welding operation is completed, the guide tube is withdrawn from the tubular first article, and relative movement is caused between the first and second support means to position the second article adjacent the tubular first article, and to position the welded connection of the articles within the tubular first article. The first wire then is cut between the exit end of the guide tube and the tubular first article, after which relative movement is caused between the guide tube and the wire gripping mechanism to withdraw the thus newly formed end of the wire into the guide tube.

This invention, together with further objects and advantages thereof will best be understood by reference to the following detailed description taken in connection with the accompanying drawings, in which:

FIG. 1 is a partial, side elevational view of the apparatus in a first operating position;

FIG. 2 is a front elevational view of the apparatus in the operating position shown in FIG. 1;

FIG. 3 is a cross-sectional view taken substantially along the line 3—3 of FIG. 2;

FIG. 4 is a cross-sectional view taken substantially along the line 4—4 of FIG. 2;

FIG. 5 is a cross-sectional view taken substantially along the line 5—5 of FIG. 2;

FIG. 6 is a partial, enlarged, cross-sectional view taken substantially along the line 6—6 of FIG. 1 and showing the apparatus in a second operating position;

FIG. 7 is a cross-sectional view taken substantially along the line 7—7 of FIG. 6;

FIG. 8 is a cross-sectional view taken substantially along the line 8—8 of FIG. 6;

FIG. 9 is a partial, enlarged, front elevational view similar to FIG. 6 and illustrating certain subsequent operating phases of the apparatus, and FIG. 10 is a schematic diagram of an electrical circuit and a drive arrangement for the apparatus.

Referring to FIG. 1 of the drawings, it is seen that the illustrated embodiment of the invention performs certain processing operations involved in the manufacture of electrical fuse assemblies used extensively in telephone switching systems and each including a spring and cap sub-assembly 12 and a tubular body sub-assembly 13. The spring and cap sub-assembly 12 includes a coil spring 14 seated in a cap member 16 and welded thereto, preferably by apparatus as disclosed in our copending application, Ser. No. 432,213, filed Feb. 12, 1965, now Patent No. 3,368,055, and assigned to the same assignee. The tubular body sub-assembly 13 includes a tubular body 17 having a cap member 18 on its upper end and a ferrule 19 attached to its lower end, the cap member having a relatively small aperture 18a (FIG. 9) therein.

More specifically, referring to FIG. 9, it is seen that the apparatus provides an electrical fuse element 21 in the form of a length of relatively thin resistance wire welded to a spade portion 14a on an axially extending wire-like portion 14b of the coil spring 14. The apparatus also seats the coil spring 14 against the ferrule 19 of the tubular body sub-assembly 13, with the axially extending portion 14b of the spring and the fuse wire 21 extending axially through the tubular body sub-assembly, and with the welded connection of the fuse wire and the spade portion 14a within the body sub-assembly. Subsequently, the sub-assemblies 12 and 13 are subjected to additional processing operations forming no part of this invention, to form a complete electrical fuse assembly.

In general, the sub-assemblies 12 and 13 are moved from left to right, as viewed in FIGS. 2 and 6, into a welding and assembling position by the indexing of a rotatable work table 22 (FIGS. 1 and 10). A wire feed mechanism 23 then feeds resistance wire 24, of a suitable material such as "Nichrome," from a supply spool 26 (FIG. 2) axially downward through the tubular body sub-assembly 13 so as to position a lower free end of the resistance wire laterally adjacent the spade portion 14a of the coil spring wire 14b of the spring and cap sub-assembly 12, as shown in FIG. 6. The lower free end of the resistance wire 24 then is welded to the spade portion 14a by a welding mechanism 27 (FIGS. 2 and 5). After the welding operation the spring and cap sub-assembly 12 and the welded wires 14b and 24 are moved vertically upward to the position shown in FIG. 9, by a lifting mechanism 28 (FIGS. 1 and 5) until the upper end of the coil spring 14 is seated against the ferrule 19 of the body sub-assembly 13, with the welded connection of the wires within the body sub-assembly, as noted hereinabove. The resistance wire 24 then is cut off above the body sub-assembly 13 by a wire cutting mechanism 29, as illustrated in FIG. 9, to form the fuse element 21, and the work table 22 is indexed to move the sub-assemblies 12 and 13 to a subsequent processing station.

As is shown in FIG. 1, the tubular body sub-assembly 13 is carried on the work table 22 in one of a plurality of upper jaw mechanisms 31 (only one shown), and the spring and cap sub-assembly 12 is carried on the work table in an associated lower jaw mechanism 32 with the sub-assemblies in substantially vertical axial alignment with one another. The upper jaw mechanism 31 includes a block-like housing 33 fixedly mounted on the work table 22, and a pair of opposed article gripping jaws 34 mounted in the housing, with at least one of the jaws preferably being spring biased to a closed position to permit ready insertion and removal of the tubular body sub-assembly 13 from the pair of jaws.

The lower jaw mechanism 32 also includes a block-like housing 36 in which a pair of article gripping jaws 37 similar to the article gripping jaws 34 are mounted. The housing 36, however, is slidably supported on the lower portions of laterally spaced vertically depending shafts 38 having their upper ends secured in the housing 33 of the upper jaw mechanism 31. The lower jaw mechanism 32 is movable vertically upward toward the upper jaw mechanism 31 by a lever 39 of the lifting mechanism 28 to move the spring and cap sub-assembly 12 and the welded wires 14b and 24 vertically upward, as noted hereinabove, and for this purpose carries a roller 41 which comes into resting engagement on a portion of the lifting lever 39 when the jaw mechanism 32 is moved into the welding and assembling position by the indexing of the work table 22.

Referring to the upper right-hand side of FIG. 2, it is seen that a lower end flange of the resistance wire supply spool 26 rests upon a horizontal support member 42 secured to the upper end of a vertical post 43 and cantilevered outward therefrom, the vertical post 43, adjacent its lower end, being secured to an adjacent one of a pair of horizontally spaced vertical side frame members 44 (FIG. 1) of the apparatus. Payoff of the resistance wire 24 from the supply spool 26 so as to prevent looping in the wire and loosening of the wire on the spool is controlled by a shiftable disc 46 and a plurality of vertically extending and circumferentially spaced wire retarding bars 47 (only three being shown), the disc resting on an upper flange of the spool 26 and the bars having their lower ends secured to the cantilevered support member 42. As the resistance wire 24 is drawn off the spool by the wire feeding mechanism 23 it passes between the periphery of the disc 46 and the upper ends of successive ones of the wire retarding bars 47. The disc 46 and the upper ends of the wire retarding bars 47 are spaced such that as the resistance wire 24 passes between the disc and each retarding bar the disc is shifted by the wire to decrease the spacing between the disc and at least the next retarding bar so that the spacing is less than the diameter of the wire. In this manner the disc 46 cooperates with the retarding bars 47 in succession to retard and control the payoff of the resistance wire 24.

The resistance wire 24 runs from the shiftable disc 46 and the upper ends of the wire retarding bars 47 into an arcuate tubular member 48 having a wire entrance end thereof in substantially vertical axial alignment with the axis of concentricity of the disc and the circumferentially spaced retarding bars. The arcuate tubular member 48 is supported on the upper end of a vertical post 49 having its lower end secured to the cantilevered support member 42. The resistance wire runs from an exit end of the arcuate tubular member 48 through an aperture in the support member 42 to a vertically movable wire gripping mechanism 51 which forms a part of the wire feeding mechanism 23.

Referring to FIGS. 2 and 3, it is seen that the wire gripping mechanism 51 includes a first gripping jaw 52 having a substantially box-shaped inner end portion 52a fixedly mounted in a recess in a substantially yoke-shaped member 53. Adjacent an outer end of the gripping jaw 52, it is provided with a pair of upper and lower vertically spaced horizontal portions 52b and 52c which are apertured for receiving the resistance wire 24 therethrough, as is best shown in FIG. 6. A second gripping jaw 54 is pivotally mounted on the box-shaped portion 52a of the fixed jaw 52, by means of a vertical pin 56 screw threaded into the fixed jaw, and is spring biased clockwise, as viewed in FIG. 3, by a wire torsion spring, toward a position in which a relatively thin wire engaging portion 54a at an outer end of the jaw 54 is received between the vertically spaced portions 52b and 52c of the fixed jaw for gripping the resistance wire 24. The gripping jaw 54 is pivotable counterclockwise, as viewed in FIG. 3, to a non-gripping position, by a cam 57 fixedly mounted on a vertical rotatable cam shaft 58 and engaged with a horizontally projecting leg portion 54b of the jaw 54 at an inner end thereof. The cam 57 is of considerable vertical height, as is best shown in FIG. 1, so that it will remain engaged with the leg portion 54b of the pivoted jaw 54 throughout the vertical movement of the wire gripping mechanism 51. As is also shown in FIG. 1, the cam shaft 58 is journalled adjacent its upper end in a horizontal upper frame member 59, and is journalled adjacent its lower end in a horizontal lower base plate 61 mounted on spaced support members 62.

As is best shown in FIGS. 1 and 3, the yoke-shaped member 53 of the vertically movable wire gripping mechanism 51, adjacent the side of the member on which the wire gripping jaws 52 and 54 are mounted, is secured to a vertically movable connecting rod 63 by a set screw 64, and the connecting rod is slidably received in apertures in the upper frame member 59 and the base plate 61. The connecting rod 63 and the wire gripping mechanism 51 are movable vertically downward by gravity and are movable vertically upward by a lifting cam 66 which is straddled by the yoke-shaped member 53 of the wire gripping mechanism and engaged with a cam follower 67 on the yoke-shaped member, and which is secured to the cam shaft 58 in encircling relationship with respect to the cam 57. Adjacent its other side the yoke-shaped member 53 slidably receives a vertical guide rod 68 therethrough for vertical movement relative to the rod, the upper and lower ends of the guide rod being fixedly mounted in the upper frame member 59 and the base plate 61, respectively.

Referring to FIGS. 1 and 2, it is seen that the resistance wire 24 extends downward from the gripping mechanism 51 of the wire feeding mechanism 23 into a vertical wire guide tube 69, which also forms a part of the wire feeding mechanism, and which has an internal diameter only slightly larger than the diameter of the relatively thin wire so that the lower free end of the wire will be positioned relatively precisely with respect to the spade portion 14a for the welding of the wire to the spade portion. The wire guide tube 69 is fixedly mounted in a horizontally projecting arm of a holder 71, and the holder is releasably connected to the vertically movable connecting rod 63 for vertical movement with the rod and the wire gripping mechanism 51, by a spring-biased ball 72 (FIG. 1) mounted in a vertically extending portion 71a of the holder and engageable in a circumferentially extending groove in the rod. The guide tube holder 71, as in the case of the yoke-shaped member 53 of the wire gripping mechanism 51, includes a yoke-shaped portion which straddles the lifting cam 66 and which, adjacent its left-hand side, as viewed in FIG. 1, receives the vertical guide rod 68 therethrough for vertical movement relative to the guide rod. As is best shown in FIGS. 2 and 6, the upper portion of the guide tube 69 is slidably received in a vertical guide aperture in the lower portion 52c of the fixed gripping jaw 52 and the lower portion of the tube is slidably received in a vertical aperture in a horizontally extending guide member 73 of the resistance wire cutting mechanism 29 for vertical movement through the guide member.

As is best shown in FIGS. 2 and 4, the guide member 73 of the resistance wire cutting mechanism 29 is fixedly mounted adjacent an inner end thereof to one of the vertical side frame members 44, and at its other or outer end has an arm 74 pivoted thereon by means of a pin 76, which arm at its outer end carries a resistance wire cutting blade 77. As viewed in FIG. 4, the arm 74 is spring biased counterclockwise by a wire torsoin spring, and is pivotable clockwise by a cam 78 secured to the vertical cam shaft 58 and engageable with an inner end portion of the arm for moving the cutting blade 77 across the undersurface of the guide member 73 to cut the resistance wire 24.

At the beginning of a cycle of operation, the wire gripping mechanism 51, the connecting rod 63, the wire guide tube holder 71 and the wire guide tube 69 are in their uppermost positions, as shown in FIGS. 1 and 2, with the lower free end of the resistance wire 24 withdrawn upward into the wire guide tube slightly above its lower exit end. The work table 22 then indexes from left to right, as viewed in FIG. 2, and moves the sub-assemblies 12 and 13 into the welding and assembling position, in which position they are vertically beneath the wire guide tube 69. With the sub-assemblies 12 and 13 so positioned, the lifting cam 66 permits the wire gripping mechanism 51, the connecting rod 63, the wire guide tube holder 71 and the wire guide tube 69 to move downward by gravity, to the position shown in FIG. 6, with the guide tube moving axially downward into the body sub-assembly 13 through the aperture 18a in the cap member 18, and through the body sub-assembly until the lower end of the guide tube is just above the spade portion 14a of the axially extending wire 14b of the coil spring 14. At this time a dwell surface on the lifting cam 66 temporarily halts downward movement of the wire gripping mechanism 51 and the connecting rod 63, and a set screw 71b (FIG. 1) at the lower end of the vertical portion 71a of the wire guide tube holder 71 engages a stop 79 on the adjacent side frame member 44.

Next, as is illustrated in FIG. 6, the lower exit end of the wire guide tube 69 and the spade portion 14a of the coil spring 14 are located in substantially vertical alignment, but slightly offset laterally relative to one another, by upper and lower forwardly projecting locating bars 81 and 82, which cooperate with upper and lower forwardly projecting locating jaws 83 and 84 for this purpose. As viewed in FIGS. 2 and 5, the locating bars 81 and 82 are secured to the right-hand side of a bracket 86 which projects laterally of a horizontally reciprocating slide 87 and which adjacent its left-hand side is secured to the front of the slide by suitable screws. The lower locating bar 82 is flexible in nature to facilitate the welding of the resistance wire 24 to the spade portion 14a, in a manner to be described, and in the illustrated embodiment of the invention is in the form of a bent wire having one end force fitted in the bracket 86, as is best shown in FIG. 8.

The slide 87 is movable from a retracted position, as shown in FIGS. 1 and 5, to the right in FIG. 1 to an advanced position, by a coil drive spring 88, and is movable to its retracted position by a cam 89 secured to the vertical cam shaft 58 and engaged with a cam follower 91 carried by an arm secured to and projecting laterally of the slide. The slide 87 is mounted by means of suitable bearings in a pair of upper and lower guideways 92 and 93 (FIGS. 1 and 2), the lower guideway 93 being fixedly mounted on the top of the base plate 61 and the upper guideway 92 being secured to the side frame members 44. The drive spring 88 for the slide 87 is partially disposed in a recess in the slide and projects from the slide into engagement with a backing plate 94 secured to the adjacent side frame member 44 and the upper and lower guideways 92 and 93.

As is best shown in FIGS. 2 and 5, the upper and lower locating jaws 83 and 84 project forwardly from and are carried on an arm 96 pivoted on a vertical pin 97 (FIG. 2) screw threaded into a support block 98 which is fixed to the top of the base plate 61. The locating jaws 83 and 84 are secured on the arm 96 by suitable vertical screws with a first spacer being provided between the locating jaws and a second spacer being provided between the lower locating jaw and the arm. As is shown in FIGS. 5, 7 and 8, each of the locating jaws 83 and 84 includes a right angle notch therein.

When the reciprocating slide 87 is in its retracted position, the arm 96 carrying the notched locating jaws 83 and 84 is held in a retracted position as shown in FIGS. 2 and 5, in which the locating jaws will not interfere with movement of the sub-assemblies 12 and 13 into and out of welding position by the work table 22, by a plate-type camming member 101 secured to the underside of the slide bracket 86, and more specifically, by a surface 101a (FIG. 5) of the camming member which is engaged with an upwardly projecting dowel 102 on the arm. The arm 96 is biased toward a closed position with respect to the upper and lower locating bars 81 and 82 on the slide bracket 86 by a torsion coil spring 103 (FIG. 2) encircling the arm's pivot pin 97 between the support block 98 and the arm.

As the reciprocating slide 87 and the locating bars 81 and 82 are moved toward their advanced position by the slide's drive spring 88, the upper locating bar 81 engages a lower end portion of the wire guide tube 69, as is best illustrated in FIG. 7. Similarly, the lower locating bar 82 engages the axially extending wire 14b of the coil spring 14 just below the spade portion 14a, as is illustrated in FIG. 8. Further, during this movement of the slide 87, the dowel 102 on the jaw carrying arm 96 rides along the surface 101a of the plate camming member 101 into engagement with a surface 101b of the camming member which is inclined with respect to the surface 101a, whereby the torsion spring 103 pivots the arm and the locating jaws 83 and 84 into a closed position with respect to the locating bars 81 and 82, as shown in FIGS. 7 and 8.

In this regard, as the arm 96 carrying the notched locating jaws 83 and 84 is pivoted toward the locating bars 81 and 82, the sides of the notch in the upper jaw 83 cooperate with the upper locating bar 81 to guide a lower end portion of the wire guide tube 69 into the apex of the notch, thereby trapping the lower end of the guide tube between the upper locating bar and the upper locating jaw, as shown in FIG. 7. Similarly, the axially extending wire 14b of the coil spring 14 is guided into a cylindrical cut-out portion at the apex of the notch in the lower locating jaw 84 and is trapped between the lower locating bar 82 and the lower locating jaw, as shown in FIG. 8. When thus trapped the wire guide tube 69 and the axially extending wire 14b are in substantially vertical axial alignment, with the lower free end of the resistance wire 24 and the spade portion 14a on the axially extending wire 14b being slightly offset laterally with respect to one another.

After the lower end of the wire guide tube 69 and the axially extending wire 14b of the coil spring 14 have been aligned by the locating bars 81 and 82 and the notched locating jaws 83 and 84, the lifting cam 66 permits the wire gripping mechanism 51 and the connecting rod 63 to move further vertically downward relative to the wire guide tube 69, with the stopped holder 71 for the guide tube releasing from the connecting rod as a result of the spring-biased ball member 72 riding out of the circumferential groove in the rod. This movement of the wire gripping mechanism 51 and the connecting rod 63 moves the resistance wire 24 downward relative to the wire guide tube 69 to move the lower end of the resistance wire out of the lower exit end of the tube and into a position opposite and closely adjacent the spade portion 14a, as shown in FIG. 6, for the welding of the lower end of the resistance wire to the spade portion by the welding mechanism 27.

As viewed in FIGS. 2 and 5, the welding mechanism 27 includes a commercial welding head 104 secured to the right-hand side of the reciprocating slide 87 for movement therewith. After the lower end of the wire guide tube 69 and the axially extending wire 14b of the coil spring 14 have been substantially vertically aligned by the locating bars 81 and 82 and the locating jaws 83 and 84, the slide 87 continues to be moved forward a short distance by its drive spring 88 against a suitable stop plate, to locate a fixed electrode 106 and a movable electrode 107 of the welding head 104 on opposite sides of the spade portion 14a of the axially extending wire, during which movement the locating bars slide relative to the wire guide tube and the axially extending wire. Then, and after the lower free end of the resistance wire 24 has been fed out of the guide tube 69 adjacent the spade portion 14a, the movable electrode 107 is moved toward the fixed electrode 106 to engage the lower free end of the resistance wire and the spade portion between the electrodes and to apply pressure to the wire and the spade portion for welding them to one another in a manner subsequently to be described.

The fixed electrode 106 is arranged to be alternately connected to, and disconnected from, an electrical power source, such as a bank of capacitors 108 (FIG. 10). For example, in the illustrated embodiment of the invention, a cable 109, which is suitably connected to the fixed electrode 106 through an electrode holder 111 for the fixed electrode, is connected to a normally open contact 112 between the electrode and the bank of capacitors 108. The bank of capacitors 108 is connectable to a power supply 113 by a normally closed contact 114 and a manually operable control switch 116. The electrode holder 111 is fixedly mounted on a housing 117 (FIG. 5) of the welding head 104 and is insulated from the housing in a suitable manner, not shown.

The welding head 104 preferably is a resistance-type welding device in which the movable electrode 107 is mounted so as to eliminate transverse wiping action or side motion of the movable electrode when the movable electrode and the fixed electrode 106 engage the lower free end of the resistance wire 24 and the spade portion 14a of the coil spring 14 therebetween and apply pressure to the wire and the spade portion during the welding operation. For example, favorable results have been achieved with the Model 1032C welding head manufactured by the Weldmatic Division of the Unitek Corporation of Monrovia, Calif., certain pertinent parts of which, including the electrodes 106 and 107, are illustrated schematically in FIGS. 2 and 5.

In this welding head 104 as applied to the subject apparatus, the movable electrode 107 is mounted in a clamp or electrode holder 118 which is secured to a first slide 119 (FIG. 5) mounted for horizontal linear movement in the housing 117, with the electrode holder 118 projecting from the slide through a horizontal slot in the front of the housing. The slide 119 is biased to the left, as viewed in FIG. 5, by a coil spring 121 which is positioned between a rearwardly projecting portion 119a of the slide and a collar 122 screw-threadably mounted on an adjusting screw 123. The adjusting screw 123 is rotatably mounted in a rearwardly projecting portion of a second slide 124, and the second slide also is mounted for horizontal linear movement in the housing 117, parallel to the first slide 119, with the rearwardly projecting slide portion 119a extending through a horizontally elongated slot in the second slide.

Adjacent the left-hand side of the second slide 124, as viewed in FIG. 5, a pull rod 126 has one end secured thereto and extends through an aperture in the welding head carrying slide 87. The other end of the pull rod 126 is suitably connected to an operating lever 127 adjacent one end of the lever. The operating lever 127 is pivoted intermediate its ends on a horizontally projecting lug 128 secured to the slide 87, and at its other end carries a roller 129 which is engageable with an operating cam 130 on the vertical cam shaft 58 when the slide 87 is moved to its advanced position. The second slide 124 is biased to the right to the position in FIG. 5 by a coil spring 131 disposed about the pull rod 126 between a wall of the housing 117 and an adjacent end of the slide 124.

When the slide 87 has reached its advanced position such that the fixed and movable electrodes 106 and 107 are on opposite sides of the spade portion 14a, and after the lower free end of the resistance wire 24 has been fed out of the wire guide tube 69 into a position opposite the spade portion, the cam 130 pivots the lever 127 to move the second welding head slide 124 to the left, as viewed in FIG. 5. Thus, the first welding head slide 119 and the movable electrode 107, as a result of the biasing spring 121, also are moved to the left in FIG. 5 toward the fixed electrode 106 such that the spade portion 14a and the free end of the resistance wire 24 are engaged between the electrodes, with the flexible lower locating bar 82 deflecting an amount sufficient to permit this engagement to occur. After the spade portion 14a and the free end of the resistance wire 24 have been engaged between the electrodes 106 and 107, the pressure exerted thereon by the electrodes increases until this pressure equals the pressure being exerted by the biasing spring 121, whereupon the second slide 124 moves relative to the first slide 119, the electrode holder 118, and the movable electrode 107. This causes a limit switch 132 (FIGS. 5 and 10), which is mounted on the second slide 124, to be moved away from an operating member 133, which is fixedly mounted on the rearwardly projecting portion 119a of the first slide 119 and which normally holds contacts of the limit switch open, such that the contacts of the limit switch now close.

As is shown in FIG. 10, in the illustrated embodiment of the invention, the closing of the limit switch 132 energizes a relay 134 which opens the normally closed contact 114 and closes the normally open contact 112. Thus, the bank of capacitors 108 is disconnected temporarily from the power supply 113, and is connected to discharge through the fixed electrode 106, the resistance wire 24, the spade portion 14a, the movable electrode 107, and the movable electrode holder 118, which is connected to ground through the rearwardly projecting portion 119a of the slide 119, thereby to weld a portion of the resistance wire adjacent its lower free end to the spade portion. The welding head operating cam 130 (FIG. 5) subsequently permits the second welding head slide 124 to be returned to its retracted position under the action of its coil return spring 131, whereupon the biasing spring 121 returns the first welding head slide 119 to its normal position relative to the second slide so that the limit switch 132 on the second slide is re-opened by its operating member 133 on the first slide. The re-opening of the limit switch 132 deenergizes the relay 134 to open the contact 112, and to close the contact 114 to reconnect the power supply 113 back to the bank of capacitors 108 to recharge the capacitors for the next welding operation.

After the welding operation is completed, the slide 87 is moved to its retracted position by its associated cam 89, thereby retracting the locating bars 81 and 82 and the welding head 104, including the electrodes 106 and 107. As the slide 87 is being retracted, the inclined surface 101b on the plate camming member 101 on the slide bracket 86, through the dowel 102 on the jaw carrying arm 96, pivots the arm and the notched locating jaws 83 and 84 thereon back to their retracted position shown in FIGS. 2 and 5.

As the slide 87 is being retracted, the pivoted jaw 54 of the wire gripping mechanisms 51 is moved to its non-gripping position by its operating cam 57 to release the resistance wire 24, after which the wire gripping mechanism, the connecting rod 63, the wire guide tube holder 71 and the wire guide tube 69 are moved vertically upward by their lifting cam 66 relative to the wire. At the same time, the lower jaw mechanism 32 on the work table 22 is raised vertically at the same rate by the lever 39 of the lifting mechanism 28, until the upper coil of the coil spring 14 seats against the ferrule 19 of the body sub-assembly 13 around a reduced portion of the ferrule, as shown in FIG. 9. As is best shown in FIGS. 1 and 5, the lever 39 is pivoted for this purpose by a cam 136 fixedly mounted on the vertical cam shaft 58 and engageable with a cam follower 137 on an operating arm 138. The operating arm 138 is secured to one end of a shaft 139 rotatably mounted in a bushing mounted in one of the vertical side frame members 44 and the lever 39 is secured adjacent one of its ends to the other end of the shaft. The lifting of the spring and cap sub-assembly 12 by the lifting mechanism 28 in this manner enables the sub-assembly to be lifted without placing any weight on the just welded resistance wire 24 and spade portion 14a, and also enables the wire guide tube 69 to guide the welded connection of the wire and the spade portion into and through the ferrule 19 into the body 17 of the sub-assembly 13.

The wire gripping mechanism 51, the connecting rod 63, the wire guide tube holder 71 and the wire guide tube 69 are moved upward by their lifting cam 66 until the guide tube reaches its uppermost position, as shown in FIG. 2, in which its lower end has been withdrawn upward just above the lower surface of the guide member 73 of the wire cutting mechanism 29. At this time upward movement of the guide tube holder 71 is limited by a vertically adjustable, upstanding post 142 (FIG. 2)

on the holder engaging the bottom of the upper frame member 59, and the connecting rod 63 and the released wire gripping mechanism 51 also stop temporarily as a result of a dwell surface on the lifting cam 66. The cutting blade carrying arm 74 then is pivoted by its associated cam 78 (FIG. 4) to move the cutting blade 77 across the undersurface of the guide member 73 to cut the resistance wire. as illustrated in FIG. 9.

Referring to FIGS. 2 and 3, it is seen that to insure that the wire guide tube holder 71 is raised in unison with the wire gripping mechanism 51, a latching mechanism, including a latch 143 pivoted on the yoke-shaped member 53 of the gripping mechanism, is provided. With downward movement of the guide tube holder 71 stopped as a result of the set screw 71b engaging the stop 79, when hook portion on the lower end of the latch 143 rides down a side of a lug 144 secured to the holder and pivots shaped member 53 positively to the holder. Thus, as the wire gripping mechanism 51 subsequently is raised by the by gravity to latch beneath the lug to connect the yoke-24 out of the wire guide tube 69, as above described, a lifting cam 66, the guide tube holder 71 is raised with the gripping mechanism. As the guide tube holder 71 reaches the upper limit of its movement, the upper end of the latch 143 engages a camming member 146 on the underside of the upper frame member 59, causing the latch to be pivoted clockwise, as viewed in FIG. 2, to a released position.

While the wire gripping mechanism 51 and the connecting rod 63 are temporarily at rest in their upward movement, the gripping mechanism cam 57 (FIG. 3) permits the gripping jaw 54 of the gripping mechanism to re-grip the resistance wire 24. Then. after the resist-the gripping mechanism 51 moves downward relative to the holder to feed the lower end of the resistance wire ance wire 24 has been cut by the cutting blade 77, the connecting rod 63 and the wire gripping mechanism 51 are moved further vertically upward by the lifting cam 66 until the spring-biased ball 72 in the stopped wire guide tube holder 71 reseats in the circumferential groove in the connecting rod. This upward movement of the wire gripping mechanism 51 and the connecting rod 63 moves the resistance wire 24 upward relative to the wire guide tube 69 so that the newly formed lower end of the resistance wire is withdrawn slightly within the lower end of the tube.

The work table 22 next is indexed to move the sub-assemblies 12 and 13 to a subsequent station and to move a new set of sub-assemblies into welding and assembling position. During an initial portion of this indexing the roller 41 on the housing 36 of the lower jaw mechanism 32 rides off the lever 39 of the lifting mechanism 28 onto an upwardly facing supporting surface (not shown) which maintains the jaw mechanism in an elevated position during the remainder of the indexing operation. As soon as the roller 41 has engaged this supporting surface, the cam 136 permits the lever 39 to return to its lowermost position by gravity so that it will not interfere with the movement of the next lower jaw mechanism 32, holding the new sub-assembly 12, into welding and assembling position. Further, to insure that the coil spring 14 is seated properly against the ferrule 19, the above-mentioned supporting surface may be provided with a raised portion for moving the lower jaw mechanism 32 further vertically upward so that the spring is tightly compressed beneath the ferrule. Then, as the sub-assemblies 12 and 13 move into the subsequent station, the supporting surface permits the lower jaw mechanism 32 to drop vertically downward back to the position shown in FIG. 9, in which the coil spring 14 is expanded, for the next processing operation. Compressing the spring 14 in this manner helps insure proper seating thereof with respect to the ferrule 19, in the event that the spring did not seat properly when initially moved upward by the lifting mechanism 28.

The indexing of the work table 22 to move the sub-assemblies 12 and 13 into and out of welding and assembling position, and the rotation of the cam shaft 58 may be synchronized in any suitable manner. For example, referring to FIG. 10, in the illustrated embodiment of the invention a main drive shaft 147 is driven by a motor 148 through a sprocket and chain drive 149, the motor being connected to the power supply 113 through the master control switch 116. The main drive shaft 147 drives the cam shaft 58 through another sprocket and chain drive 151. Similarly, the main drive shaft 147, through a sprocket and chain drive 152, drives a Geneva wheel 153 for intermittently indexing the work table 22 in timed relationship with respect to the rotation of the cam shaft 58, in a manner well known to those skilled in the art.

The arrangement in which the lower end of the resistance wire 24 is withdrawn within the lower end of the wire guide tube 69, and remains withdrawn in the guide tube until it has been fed downward substantially into welding position, as above described, is particularly advantageous where the wire is relatively fine, as in the illustrated embodiment of the invention, in which the diameter of the wire 24 is only five thousandths of an inch. This arrangement also is advantageous in instances in which the wire 24 must be fed through a confined space, such as the small aperture 18a in the cap member 18 of the body sub-assembly 13. Otherwise, the end of the wire 24 might become bent over during the feeding operation, such that the wire would not be welded to the spade portion 14a by the welding mechanism 27, or would be improperly welded to the spade portion.

*Operation*

In operation, the control switch 116 is closed, as shown in FIG. 10, and the motor 148 continuously rotates the cam shaft 58 and drives the Geneva wheel 153 through the main drive shaft 147 and the sprocket and chain drives 149, 151 and 152. At the beginning of a cycle, the apparatus is in its upper retracted position shown in FIGS. 1 and 2, with the lower free end of the resistance wire 24 withdrawn upward into the wire guide tube 69 slightly above its lower exit end. The work table 22 then is indexed by the Geneva wheel 153 from left to right, as viewed in FIG. 2, to move a spring and cap sub-assembly 12 in one of the lower jaw mechanisms 32 (only one shown) on the work table, and a tubular body sub-assembly 13 in the associated upper jaw mechanism 31 on the work table, into a welding and assembling position in which the sub-assemblies are substantially vertically beneath the wire guide tube 69.

The lifting cam 66 then permits the wire gripping mechanism 51, the connecting rod 63, the wire guide tube holder 71 and the wire guide tube 69 to move downward by gravity, with the guide tube moving downward into the body sub-assembly 13 through the aperture 18a in the cap member 18 and through the body sub-assembly until the lower end of the guide tube is just above the spade portion 14a of the axially extending wire 14b of the coil spring 14. At this time the lifting cam 66, as a result of one of the dwell surfaces thereon, temporarily halts downward movement of the wire gripping mechanism 51 and the connecting rod 63, and the set screw 71b (FIG. 1) in the lower end of the vertically extending portion 71a of the wire guide tube holder 71 engages the stop member 79.

The lower exit end of the wire guide tube 69 and the spade portion 14a of the coil spring 14 then are located in substantially vertical alignment, but slightly offset laterally relative to one another, as shown in FIG. 6, by the locating bars 81 and 82 and the locating jaws 83 and 84. In this regard, as the reciprocating slide 87 and the forwardly projecting locating bars 81 and 82 are moved toward their advanced position by the slide's drive spring 88, the upper locating bar 81 engages a lower end portion of the wire guide tube 69 as shown in FIG. 7. Similarly, the lower locating bar 82 engages the axially extending wire 14b of the coil spring 14 just below the spade portion 14a, as shown in FIG. 8. Further, the dowel 102 on the pivoted arm 96 rides along the surface 101a of the plate camming member 101 on the slide bracket 86 into engagement with the inclined surface 101b of the camming member so that the torsion spring 103 pivots the arm and the locating jaws 83 and 84 thereon into a closed position with respect to the locating bars 81 and 82, as shown in FIGS. 7 and 8.

More specifically, the sides of the right angle notch in the upper jaw 83 cooperate with the upper locating bar 81 to trap the lower end of the wire guide tube 69 between the upper locating bar and the upper locating jaw, as shown in FIG. 7. Similarly, the axially extending wire 14b of the coil spring 14 is trapped in the cylindrical cutout portion in the apex of the notch in the lower locating jaw 84 between the lower locating bar 82 and the lower locating jaw, as shown in FIG. 8. When thus trapped the wire guide tube 69 and the axially extending wire 14b are in substantially vertical axial alignment, with the lower free end of the resistance wire 24 and the spade portion 14a slightly offset laterally with respect to one another.

After the lower end of the wire guide tube 69 and the axially extending wire 14b of the coil spring 14 have been substantially aligned as above described, the lifting cam 66 permits the wire gripping mechanism 51 and the connecting rod 63 to move farther vertically downward relative to the wire guide tube 69, to move the resistance wire 24 downward relative to the wire guide tube 69, so as to move the lower end of the resistance wire out of the lower exit end of the tube and into a position opposite and closely adjacent the spade portion 14a, as shown in FIG. 6, for the welding of the lower end of the resistance wire to the spade portion by the welding mechanism 27. During this movement of the wire gripping mechanism 51 and the connecting rod 63, movement of the wire guide tube holder 71 is prevented by the stop member 79 and the holder releases from the connecting rod as a result of the spring-biased ball member 72 riding out of the circumferential groove in the rod. Further, the latch 43 on the yoke-shaped member 53 of the wire gripping mechanism 51 rides down the lug 44 on the guide tube holder 71 and latches beneath the lug to connect the holder to the yoke-shaped member.

After the locating bars 81 and 82 and the locating jaws 83 and 84 have aligned the lower end of the wire guide tube 69 and the axially extending wire 14b of the coil spring 14, the slide 87 is moved forward an additional increment against its associated stop plate by its drive spring 88, to locate the fixed electrode 106 and the movable electrode 107 of the welding head 104 on opposite sides of the spade portion 14a, and to cause the welding head operating cam 130 (FIG. 5) to be engaged by the cam follower 129. During this movement of the slide 87, the upper and lower locating bars 81 and 82 slide relative to the wire guide tube 69 and the axially extending wire 14b, respectively.

After the lower free end of the resistance wire has been fed adjacent the spade portion 14a, the welding head operating cam 130 pivots the operating lever 127 clockwise, as viewed in FIG. 5, to move the pull rod 126 and the welding head slide 124 secured thereto, to the left, as viewed in this figure. Thus, the welding head slide 119 and the movable electrode 107 carried thereby, also are moved to the left in FIG. 5 by the biasing spring 121 such that the spade portion 14a and the lower free end of the resistance wire 24 are engaged between the fixed electrode 106 and the movable electrode 107. The pressure exerted on the spade portion 14a and the free end of the resistance wire 24 by the electrodes 106 and 107 then progressively increases until this pressure equals the pressure being exerted by the biasing spring 121, whereupon the welding head slide 124 moves relative to the welding head slide 119, the electrode holder 118 and the movable electrode 107, such that the limit switch 132 is moved away from its operating member 133 and the normally open contacts of the limit switch close.

As is shown in FIG. 10, the closing of the limit switch 132 energizes the relay 134 to open the normally closed contact 114 and to close the normally open contact 112, thereby temporarily disconnecting the bank of capacitors 108 from the power supply 113, and connecting the bank of capacitors to discharge through the fixed electrode 106, the resistance wire 24, the spade portion 14a, the movable electrode 107 and the grounded electrode holder 118, to weld the resistance wire to the spade portion.

Subsequently, the welding head operating cam 130 permits the welding head slide 124 to be returned to its retracted position under the action of its coil return spring 131, whereupon the biasing spring 121 restores the welding head slide 119 to its normal position relative to the slide 124 and the limit switch 132 is re-opened by its operating member 133. The re-opening of the limit switch 132 deenergizes the relay 134 to open the contact 112, and to close the contact 114 to reconnect the power supply 113 back to the bank of capacitors 108 to recharge the capacitors for the next welding operation.

After the welding operation is completed the slide 87 is moved to its retracted position by its associated cam 89, thereby retracting the locating bars 81 and 82 and the welding head 104, including the electrodes 106 and 107. During the retraction of the slide 87, the inclined surface 101b on the plate camming member 101, through the dowel 102 on the jaw carrying arm 96, pivots the arm and the notched locating jaws 83 and 84 thereon back to their retracted position shown in FIGS. 2 and 5.

As the slide 87 is being retracted the pivoted jaw 54 of the wire gripping mechanism 51 is moved to its nongripping position by its operating cam 57 to release the resistance wire 24, after which the wire gripping mechanism, the connecting rod 63, the wire guide tube holder 71, which is connected to the wire gripping mechanism by the latch 143, and the wire guide tube 69, are moved vertically upward by their lifting cam 66 relative to the wire. At the same time, the operating cam 136 of the lifting mechanism 28 causes pivoting of the lever 39 of the lifting mechanism to raise the lower jaw mechanism 32 on the work table 22 vertically upward and at the same rate to seat the upper coil of the coil spring 14 against the ferrule 19, as shown in FIG. 9.

The wire gripping mechanism 51, the connecting rod 63, the wire guide tube holder 71 and the wire guide tube 69 are moved upward in unison by their lifting cam 66 until the post 142 on the guide tube holder engages the upper frame member 59, by which time the latch 143 has been pivoted to its released position by engagement with the camming member 146 and the lower end of the guide tube has been withdrawn upward just above the lower surface of the guide member 73 of the wire cutting mechanism 29. At this time, the released wire gripping mechanism 51 and the connecting rod 63 also stop temporarily as a result of one of the dwell surfaces on the lifting cam 66. The cutting blade carrying arm 74 then is pivoted by its associated cam 78 (FIG. 4) to move the cutting blade 77 across the undersurface of the guide member 73 to cut the resistance wire 24, as illustrated in FIG. 9.

While the wire gripping mechanism 51 and the connecting rod 63 are temporarily at rest in their upward movement, the wire gripping mechanism operating cam 57 (FIG. 3) permits the gripping jaw 54 to re-grip the resistance wire 24. Then, after the resistance wire 24 has been cut by the cutting blade 77, the wire gripping mechanism 51 and the connecting rod 63 are moved further vertically upward by the lifting cam 66 relative to the wire guide tube holder 71 until the spring-biased ball 72 in the holder reseats in the circumferential groove in the connecting rod, thereby moving the resistance wire 24 upward relative to the wire guide tube 69 to withdraw the newly formed lower end of the resistance wire slightly within the lower end of the tube.

The work table 22 then is again indexed by the Geneva wheel 153 to move the welded and assembled sub-assemblies 12 and 13 to a subsequent station and to move a new set of the sub-assemblies into welding and assembling position. During an initial portion of this indexing the roller 41 of the lower jaw mechanism 32 rides off the lifting mechanism lever 39 onto the above-mentioned upwardly facing supporting surface (not shown) whereupon the cam 136 permits the lever to return to its lower position so that it will not interfere with movement of the next lower jaw mechanism 32, holding the new sub-assembly 12, into welding and assembling position. During the remainder of the indexing the supporting surface maintains the lower jaw mechanism in an elevated position. Further, to help insure that the coil spring 14 is seated properly against the ferrule 19, the supporting surface moves the lower jaw mechanism 32 further vertically upward to compress the coil spring 14 tightly beneath the ferrule, and then subsequently permits the lower jaw mechanism 32 to drop vertically downward back to the position shown in FIG. 9, in which the coil spring 14 is expanded for the next processing operation.

While one embodiment of the invention has been disclosed, many modifications will be apparent and it is intended that the invention be interpreted as including all modifications which fall within the true spirit and scope of the invention.

What is claimed is:

1. Apparatus for welding a wire to an article, which comprises:
   a tubular guide member in which the wire is received with an end of the wire withdrawn within said guide member adjacent a wire exit end of said guide member, the wire exit end of said guide member being substantially the same size as the wire so that the wire exits from said guide member through the wire exit end in relatively close-fitting relationship with respect to said guide member;
   means for supporting the article;
   means for causing relative movement between said guide member and said support means, with the end of the wire withdrawn within said guide member adjacent its wire exit end, to position the wire exit end of said guide member adjacent the article;
   means for locating the wire exit end of said guide member and a preselected portion of the article substantially in alignment with one another;
   means for causing relative movement between the wire and said guide member so that the end of the wire is fed out of the substantially aligned wire exit end of said guide member adjacent the preselected portion of the article; and
   means for welding an end portion of the wire to the preselected portion of the article.

2. Apparatus for welding wire to an article, which comprises:
   a continuous supply of wire;
   a tubular guide member through which the wire is fed from said wire supply and having an open end through which a free end of the wire exits from said guide member in relatively close-fitting relationship with respect to said guide member;
   means for supporting the article;
   means for causing relative movement between said guide member and said support means, with the free end of the wire withdrawn within said guide member adjacent its wire exit end, to position the wire exit end of said guide member adjacent the article;
   means for locating the wire exit end of said guide member and a preselected portion of the article substantially in alignment with one another;
   means for causing relative movement between the wire and said guide member in a first direction so that the free end of the wire is fed out of the substantially aligned wire exit end of said guide member adjacent the preselected portion of the article;
   means for welding a free end portion of the wire to the preselected portion of the article;
   means for causing relative movement between said guide member and said support means to expose a portion of the wire between the wire exit end of said guide member and the welded connection of the wire to the preselected portion of the article;
   means for cutting the exposed portion of the wire between the wire exit end of said guide member and the welded connection of the wire to the preselected portion of the article, to form a length of wire welded to the preselected portion of the article, and to form a new free end on the wire; and
   means for causing relative movement between the wire and said guide member in a direction opposite to the first direction to withdraw the newly formed free end of the wire within said guide member adjacent its wire exit end.

3. Assembling apparatus, which comprises:
   means for supporting a tubular first article and a second article in spaced relationship;
   a continuous supply of wire;
   a guide tube through which the wire is fed from said wire supply and having an open end through which a free end of the wire exits from said tube in relatively close-fitting relationship with respect to said guide tube;
   means for causing relative movement between said guide tube and said support means, with the free end of the wire withdrawn within said guide tube adjacent its wire exit end, so that said guide tube is received axially through the tubular first article to position the wire exit end of said guide tube adjacent the second article;
   means for locating the wire exit end of said guide tube and a preselected portion of the second article substantially in alignment with one another;
   means for causing relative movement between the wire and said guide tube in a first direction so that the free end of the wire is fed out of the substantially aligned wire exit end of the guide tube adjacent the preselected portion of the second article;
   means for welding a free end portion of the wire to the preselected portion of the second article;
   means for causing relative movement between said guide tube and said support means to withdraw said guide tube from the tubular first article relative to the wire after the free end portion of the wire has been welded to the preselected portion of the second article;
   means for cutting the wire between the wire exit end of said guide tube and the tubular first article after the guide tube has been withdrawn from the first article, to form a length of wire welded to the preselected portion of the second article and extending through the tubular first article, and to form a new free end on the wire; and
   means for causing relative movement between the wire and said guide tube in a direction opposite to the first direction, to withdraw the newly formed free end of the wire within the guide tube adjacent its wire exit end.

4. Assembling apparatus, as recited in claim 3, in which said support means includes first and second relatively movable support means for supporting the tubular first article and the second article, respectively, and in which the apparatus further includes means for causing relative movement between said first and second support means to position the welded connection of the wire to the preselected portion of the second article adjacent the tubular first article, and to position the second article adjacent the tubular first article.

5. Assembling apparatus, as recited in claim 3, in which said support means includes first and second relatively movable support means for supporting the tubular first article and the second article, respectively, in which said guide tube is moved relative to only said first support means during an initial portion of the withdrawal of said guide tube from the tubular first article after the free end portion of the wire has been welded to the preselected portion of the second article, and in which the apparatus further includes means for moving said second support means relative to said first support means with said guide tube during the initial portion of said guide tube's withdrawal from the tubular first article, to move the wire and the second article relative to said first support means with said guide tube and so that said guide tube guides the welded connection of the wire to the second article into the tubular first article.

6. Apparatus for welding a wire to a wire-like element, which comprises:
 a guide tube in which the wire is received with an end of the wire withdrawn within said guide tube adjacent a wire exit end of said guide tube, the wire exit end of said guide tube being substantially the same size as the wire so that the wire exits from said guide tube through the wire exit end in relatively close-fitting relationship with respect to said guide tube;
 means for supporting said guide tube and the wire-like element with the wire exit end of said guide tube adjacent the wire-like element;
 a reciprocating member;
 first and second elongated locating members on said reciprocating member engageable with said guide tube adjacent its wire exit end and with the wire-like element, respectively, as said reciprocating member is moved to an advanced position;
 first and second pivoted locating jaws having notches therein;
 means responsive to the movement of said reciprocating member to its advanced position for pivoting said first and second locating jaws into engagement with said guide tube adjacent its wire exit end and with the wire-like element, respectively, so that said locating members and said locating jaws trap said guide tube and the wire-like element in apices of the notches in respective ones of said locating jaws, and locate the wire exit end of said guide tube and the wire-like element substantially in axial alignment with one another;
 means for causing relative movement between the wire and said guide tube after the wire exit end of said guide tube and the wire-like element have been substantially aligned by said locating members and said locating jaws, so that the end of the wire is fed out of the wire exit end of said guide tube adjacent the wire-like element; and
 means for welding an end portion of the wire to the wire-like element.

7. Assembly apparatus, which comprises:
 indexing means for moving a tubular first article and a second article into and out of an assembling position;
 means on said indexing means for supporting the tubular first article and the second article, respectively, in spaced relationship with a projecting wire-like portion of the second article in substantially axial alignment with the tubular first article;
 a continuous supply of wire;
 a guide tube through which the wire is fed from said wire supply and having an open end through which a free end of the wire exits from said tube in relatively close-fitting relationship with respect to said tube;
 releasable means for gripping the wire, said wire gripping means and said guide tube being relatively movable to cause relative movement between the wire and said guide tube;
 means for causing relative movement between said guide tube and said support means, with the free end of the wire withdrawn within said guide tube adjacent its wire exit end, so that said guide tube is received axially through the tubular first article to position the wire exit end of said guide tube adjacent the wire-like portion of the second article;
 a reciprocating carrier movable between advanced and retracted positions;
 means, partially mounted on said reciprocal carrier for movement therewith and responsive to movement of said carrier to its advanced position, for locating the wire exit end of said guide tube and the wire-like portion of the second article substantially in alignment with one another;
 means for causing relative movement between said wire gripping means and said guide tube in a first direction so that the free end of the wire is fed out of the substantially aligned wire exit end of said guide tube adjacent the wire-like portion of the second article;
 a welding mechanism mounted on said reciprocating carrier for movement therewith and including relatively movable opposed electrodes;
 means for causing relative movement of the electrodes of said welding mechanism toward one another when said carrier is in its advanced position so that the electrodes engage a free end portion of the wire and the wire-like portion of the second article therebetween, to weld the portions to one another;
 means for causing relative movement between said guide tube and said support means to withdraw said guide tube from the tubular first article relative to the wire after the free end portion of the wire and wire-like portion of the second article have been welded to one another;
 means for releasing said wire gripping means to permit relative movement between the wire and said wire gripping means after the free end portion of the wire and the wire-like portion of the article have been welded to one another;
 means for cutting the wire between the wire exit end of said guide tube and the tubular first article after the guide tube has been withdrawn from the first article, to form a length of wire welded to the wire-like portion on the second article and extending through the tubular first article, and to form a new free end on the wire;
 means for causing relative movement between said wire gripping means and said guide tube in a direction opposite to the first direction to withdraw the newly formed free end of the wire within said guide tube adjacent its wire exit end; and
 means for reciprocating said carrier and for moving said carrier, including the portion of said locating means and said welding mechanism thereon, to its retracted position, so that said indexing means can move the first and second articles and the length of wire welded to the second article out of the assembling position.

8. Assembling apparatus, as recited in claim 7, in which said wire gripping means is released by said releasing means to permit relative movement between the wire and said wire gripping means during the withdrawal of said guide tube from the tubular first article, in which said support means includes first and second relatively movable support means for supporting the tubular first article and the second article, respectively, and in which the apparatus further includes means for causing relative movement between said first and second support means to position the welded connection of the wire portions within the tubular first article and to position the second article adjacent the first article.

References Cited

UNITED STATES PATENTS

| | | | |
|---|---|---|---|
| 2,606,268 | 8/1952 | Pityo et al. | 219—103 X |
| 2,806,934 | 9/1957 | Andersson et al. | 219—103 |
| 3,050,618 | 8/1962 | Lasch et al. | 219—85 |
| 3,289,452 | 12/1966 | Kollner | 228—3 X |
| 3,294,950 | 12/1966 | Hagner et al. | 219—103 |
| 3,307,763 | 3/1967 | Rasimenoks et al. | 140—112 X |
| 3,313,464 | 4/1967 | Avedissian | 228—3 |
| 3,314,582 | 4/1967 | Haigler | 228—3 |
| 3,321,606 | 5/1967 | Cropp et al. | 219—79 |
| 3,342,396 | 9/1967 | Miller | 228—3 |

RICHARD M. WOOD, *Primary Examiner.*

B. A. STEIN, *Assistant Examiner.*

U.S. Cl. X.R.

219—103; 140—112

UNITED STATES PATENT OFFICE
CERTIFICATE OF CORRECTION

Patent No. 3,431,387                                                                 March 4, 1969

Gary G. Seaman et al.

It is certified that error appears in the above identified patent and that said Letters Patent are hereby corrected as shown below:

Column 3, line 18, "rceived" should read -- received --. Column 11, line 13, beginning with "With down-", cancel all to and including "gripping mechanism in line 23, same column 11 and insert -- With downward movement of the guide tube holder 71 stopped as a result of the set screw 71b engaging the stop 79, when the gripping mechanism 51 moves downward relative to the holder to feed the lower end of the resistance wire 24 out of the wire guide tube 69, as above described, a hook portion on the lower end of the latch 143 rides down a side of a lug 144 secured to the holder and pivots by gravity to latch beneath the lug to connect the yoke-shaped member 53 positively to the holder. Thus, as the wire gripping mechanism 51 subsequently is raised by the lifting cam 66, the guide tube holder 71 is raised with the gripping mechanism. --; line 33, beginning with "Then after the" cancel all to and including "connecting rod" in line 41, same column 11 and insert -- Then, after the resistance wire 24 has been cut by the cutting blade 77, the connecting rod 63 and the wire gripping mechanism 51 are moved further vertically upward by the lifting cam 66 until the spring-biased ball 72 in the stopped wire guide tube holder 71 reseats in the circumferential groove in the connecting rod. --. Column 17, line 63, "Assembly" should read -- Assembling --.

Signed and sealed this 14th day of April 1970.

(SEAL)
Attest:

EDWARD M. FLETCHER, JR.                                        WILLIAM E. SCHUYLER, JR.
Attesting Officer                                                       Commissioner of Patents